E. SMITH.

Stoves.

No. 5,963. Reissued July 7, 1874.

Witnesses:

Henry W. DePuy

W. E. Parker

Inventor:

Elisha Smith

Per Connes & Co.

Attorneys.

THE GRAPHIC CO. PHOTO-LITH. 39 & 41 PARK PLACE, N.Y.

UNITED STATES PATENT OFFICE.

ELIHU SMITH, OF ALBANY, NEW YORK.

IMPROVEMENT IN STOVES.

Specification forming part of Letters Patent No. 88,986, dated April 13, 1869; reissue No. 5,709, dated December 30, 1873; reissue No. 5,963, dated July 7, 1874; application filed June 27, 1874.

DIVISION B.

*To all whom it may concern:*

Be it known that I, ELIHU SMITH, of the city and county of Albany, in the State of New York, have invented certain new and useful Improvements in Base-Burning Stoves, of which the following specification is sufficiently full, clear, and exact to enable those skilled in the art to which the invention appertains to make and use the same, reference being had to the accompanying drawings which form a part hereof.

My invention consists, first, in an annular flue, surrounding an annular section of the fire-pot, receiving the smoke and gases evolved during the process of combustion, in combination with a horizontal flue below the ash-chamber and bottom plate proper of the stove, with an intermediate flue connecting the two said flues; second, my invention also consists in a flue open at both ends, passing up from the ash-pan chamber, or from the bottom of the stove through the ash-chamber, through the fire-pot and fire or combustion chamber, and the reservoir or supply-cylinder to the top of the stove, provided with a damper and lateral branch flues, whereby currents of air to be heated may be conducted from the ash-chamber, or from the bottom of the stove, or from an open chamber thereunder, up through the fire-pot and combustion-chamber or fire-pot, combustion-chamber, and reservoir, and out into the room, as hereinafter more specifically set forth; third, my invention also consists in an annular arch-top combustion-chamber, in which one side of the arch forms a portion of the radiating surface of the stove, while the opposite side deflects the heat to the outer casing thereof.

Figure 5:
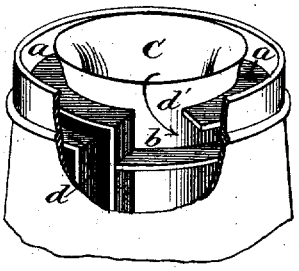
Figure 6:
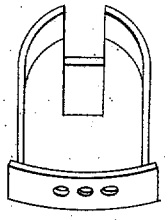
Figure 1:
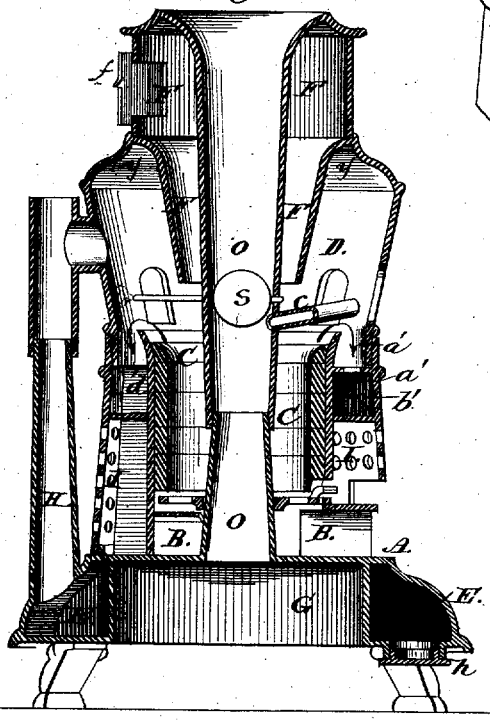
Figure 2:
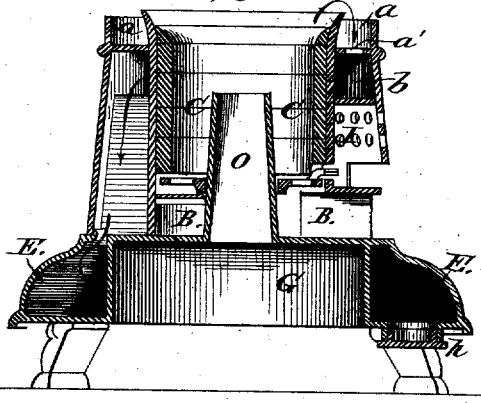
Figure 3:
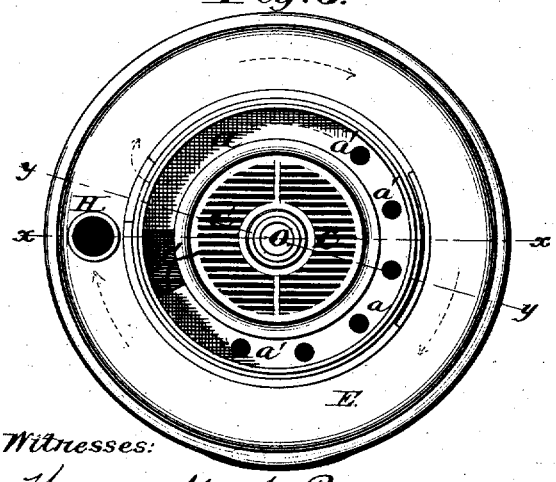
Figure 4:
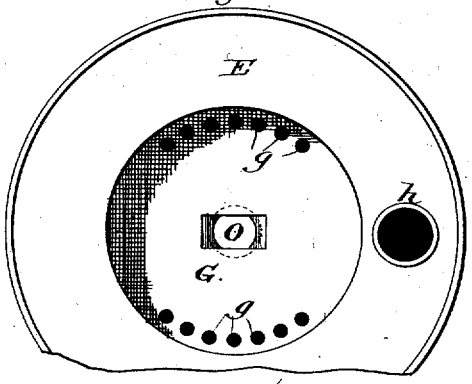

In the annexed drawings, Figure 1 represents a vertical section on line *x x* of Fig. 3 of a heating-stove, having my improvements incorporated into its organization. Fig. 2 is a vertical section, on line *y y* of Fig. 3, of that portion of the stove which is below the combustion-chamber, showing the descending and the upper and lower annular flues. Fig. 3 is a horizontal section taken at the top of the fire-pot, and showing in said section so much of the stove as is represented in Fig. 2. Fig. 4 is a bottom view of my stove. Fig. 5 is a perspective view of the upper portion of the fire-pot and the outer casing inclosing the same, with a portion of the latter broken away, showing the upper annular and descending flues. Fig. 6 is a representation of the ash-draw.

A is the base or bottom plate of the stove. B is the ash-chamber; C, the fire-pot; D, the combustion-chamber, provided with mica windows; and F the coal-reservoir, which latter is supplied through the feed-door *f*. *a* represents an annular space or chamber formed between the outer casing and the extreme upper portion of the fire-pot, receiving the products of combustion over and all around the upper edge of the latter, whence they may pass down through openings *a'*, and the larger opening *d'*, into the upper annular flue *b*, surrounding an annular section of the upper portion of the fire-pot, in which flue they pass horizontally, or nearly so, from the point of entrance to the descending flue *d*, which has its opening into the said annular flue next adjoining the upward opening *d'*, in said flue. This descending flue *d* extends below the base-plate, and opens into an annular flue, E, thereunder, which annular flue conducts the escaping products of combustion in a circuit around to the front and again to the back of the stove, radiating and conducting the heat from all sides of said flue directly to the air within the room being warmed.

From the annular flue E the escaping products enter the exit-pipe H, through which they are drawn to the chimney after having given off by radiation and conduction almost the entire quantity of heat which they have absorbed or taken from the combustion chamber during the process of combustion. O is a flue for heating air by passing it through the fire-pot and combustion-chamber, said flue extending through the bottom plate and through the ash-chamber, fire-pot, combustion-chamber, and reservoir, and open at the top of the stove. This flue is made rectangular at that part which passes through the ash-chamber, for the purpose of easily fitting the ash-draw to the same. It is made cylindrical at that part which passes through the grate for the purpose of enabling the grate to rotate about the same. This vertical hot-air flue communicates with the open space in the room through lateral branch flues, as represented at *e*, Fig. 1. These lateral flues pass from the main upright flue through the fire or combustion chamber, and through the outer casing of the stove, for the purpose of discharging the heated air of the main flue lower down or nearer the floor than the top of the stove.

When it is desirable to discharge the heated air in the upper part of the room through the mouth of the flue, at the top of the stove, the valve *s* in said flue is opened, as shown in the figure; but when it is desirable to discharge the heated air lower down in the room, through the branch flue *e*, the valve *s* is closed, and the air is compelled to pass out through the lateral branch flues.

The vertical air-flue O opens at the base of the stove into a circular open chamber, G, thereunder, formed by the annular flue E, and the base-plate A. In this chamber the air may be heated to some extent before entering the flue O. This flue is gradually enlarged from a point within the fire-pot or combustion-chamber to its top, for the purpose of facilitating the expansion of the air passing through it.

If desired, the heating of air by direct contact with the outer surface of the fire-pot may be effected by the formation of a chamber, I, between the latter and the outer casing surrounding the same, said casing being perforated, as shown in Figs. 1 and 2, and the air to be heated passed up from the chamber G, through openings *g*, which would, in this case, be formed in the base-plate A, and when so heated, would escape into the room through the perforations referred to.

The arrows in Fig. 3 indicate the direction of the escaping products of combustion, as they traverse the several annular flues on their way to the exit-pipe H. *h* is an opening, closed by a cap, provided for the purpose of cleaning the annular flue E.

The top of the combustion-chamber is arched, as shown at *y y*, for the purpose of deflecting the heat to the outer casing or plates of the stove, thus securing a higher temperature of the radiating surface, and gaining the full benefit of the combustion of the fuel.

I claim as my invention—

1. In a base-burning coal-reservoir heating stove or furnace, the combination, in communication, of an annular flue surrounding an annular section of the fire-pot, a base-flue entirely below the bottom-plate of the stove, and an intermediate flue connecting the said base and annular flues, substantially as set forth.

2. In a base-burning coal-reservoir heating-stove, an ascending air-flue open at the top and bottom of the stove, extending through the fire-pot, combustion-chamber, and reservoir, in combination with a branch flue, *c*, communicating with the outer air through the combustion-chamber and outer casing of the stove, said ascending flue being provided with a damper located at a point above the point of junction of the two flues, substantially as and for the purpose set forth.

3. In a base-burning coal-reservoir heating stove or furnace, a flue for conducting air to be heated, extending up through the fire-pot into the combustion-chamber, in which latter it is exposed directly to the heat therein, and communicating with the air without the stove, through the outer casing thereof, at a point within the circumference of said chamber, substantially as set forth.

4. In a base-burning coal-reservoir heating stove or furnace, an annular arch-top combustion-chamber, in which the inwardly-inclined side of the arch forming the top of said chamber extends without the magazine-chamber, and forms a portion of the outer casing or radiating surface of the stove, and the opposite or outwardly-inclined side of said arch reflects its incident heat-rays to the side first described, or the outer casing of the stove, substantially as and for the purpose set forth.

In testimony that I claim the invention as above specified I have hereunto set my hand in presence of two subscribing witnesses.

ELIHU SMITH.

Witnesses:

FRANK CHASE SOMES,
D. E. SOMES.